(12) United States Patent
Tamura et al.

(10) Patent No.: US 11,002,709 B2
(45) Date of Patent: May 11, 2021

(54) ULTRASONIC INSPECTION SYSTEM

(71) Applicant: Hitachi-GE Nuclear Energy, Ltd., Hitachi (JP)

(72) Inventors: Akinori Tamura, Tokyo (JP); Naoyuki Kouno, Tokyo (JP); Tetsuya Matsui, Hitachi (JP); Masahiro Koike, Hitachi (JP)

(73) Assignee: Hitachi-GE Nuclear Energy, Ltd., Hitachi (JP)

( * ) Notice: Subject to any disclaimer, the term of this patent is extended or adjusted under 35 U.S.C. 154(b) by 371 days.

(21) Appl. No.: 16/202,794

(22) Filed: Nov. 28, 2018

(65) Prior Publication Data

US 2019/0195830 A1  Jun. 27, 2019

(30) Foreign Application Priority Data

Dec. 26, 2017  (JP) .............................. JP2017-248741

(51) Int. Cl.
*G01N 29/07* (2006.01)
*G01N 29/24* (2006.01)
(Continued)

(52) U.S. Cl.
CPC ........... *G01N 29/07* (2013.01); *B06B 1/0651* (2013.01); *G01B 17/02* (2013.01); *G01N 29/2437* (2013.01); *G01N 29/30* (2013.01); *B06B 1/0215* (2013.01); *B06B 1/0625* (2013.01); *G01N 2291/011* (2013.01); *G01N 2291/02854* (2013.01); *G01N 2291/044* (2013.01); *G01N 2291/2626* (2013.01); *G01N 2291/2634* (2013.01)

(58) Field of Classification Search
CPC .... G01N 29/07; G01N 29/30; G01N 29/2437; G01N 2291/2634; G01N 2291/011; G01N 2291/02854; G01N 2291/2626; G01N 2291/044; B06B 1/0651; B06B 1/0625; B06B 1/0215; G01B 17/02
See application file for complete search history.

(56) References Cited

U.S. PATENT DOCUMENTS

| 5,240,552 A | * | 8/1993 | Yu | ........................... B24B 37/04 |
| | | | | 257/E21.244 |
| 2014/0331771 A1 | * | 11/2014 | Baba | .................... G01N 29/326 |
| | | | | 73/597 |

FOREIGN PATENT DOCUMENTS

JP         2015-78910 A       4/2015

* cited by examiner

*Primary Examiner* — Suman K Nath
(74) *Attorney, Agent, or Firm* — Crowell & Moring LLP

(57) ABSTRACT

An ultrasonic inspection system includes an ultrasonic sensor and a control device. The ultrasonic sensor has a piezoelectric element that transmits and receives ultrasonic waves and plate portions and that are arranged so as to contact an upper surface of the piezoelectric element and have different thicknesses. The control device acquires a propagation time of a reflected wave reflected on an upper surface of the plate portion, calculates a sound velocity of the plate portion using the propagation time of the reflected wave and a thickness of the plate portion, and corrects a sound velocity of a pipe and acquires a sound velocity of the plate portion based on the calculated sound velocity. In addition, the control device acquires a propagation time of a reflected wave reflected on an upper surface of the plate portion, and calibrates a time axis based on the propagation time of the reflected wave, a thickness of the plate portion, and the sound velocity of the plate portion.

6 Claims, 11 Drawing Sheets

(51) Int. Cl.
*B06B 1/06* (2006.01)
*G01B 17/02* (2006.01)
*G01N 29/30* (2006.01)
*B06B 1/02* (2006.01)

ULTRASONIC INSPECTION SYSTEM

BACKGROUND OF THE INVENTION

1. Field of the Invention

The present invention relates to an ultrasonic inspection system that measures a thickness of a subject.

2. Description of the Related Art

An ultrasonic inspection, one of non-destructive inspections, has been adopted in a wide range of fields for reasons such as low cost and easy application. In nuclear power plants, thermal power plants, or the like, an ultrasonic inspection for periodically measuring a wall thickness or the like of a pipe, a container, or the like is carried out periodically to ensure soundness of the pipe, the container, or the like. Specifically, an ultrasonic sensor is pressed against a predetermined inspection point after removing a heat insulating material from the pipe, the container, or the like, and the ultrasonic inspection is performed. Thus, it is necessary to restore the heat insulating material after the inspection. If an inspection site is at a high place, it is necessary to assemble a scaffold before the inspection and to remove the scaffold after the inspection. In addition, the ultrasonic sensor is manually arranged, and thus, it is necessary to arrange the ultrasonic sensor carefully such that a propagation direction of ultrasonic waves is appropriate. In the nuclear power plants and the like, an inspection of a large number of pipes, containers, or the like is regulated, which requires a lot of labor and time.

Therefore, it has been proposed to fix an ultrasonic sensor in advance on a surface of a pipe under a heat insulating material, for example. As a result, it is possible to perform an ultrasonic inspection without attaching and detaching the heat insulating material. In addition, it is possible to reduce a burden of a periodical inspection by performing the ultrasonic inspection during an operation of a plant. However, since the ultrasonic sensor is fixed to the surface of the pipe under the heat insulating material, it is difficult to calibrate the device by separately preparing a calibration test piece as in the related art. Therefore, it has been proposed to incorporate a calibration plate whose thickness and material are already known into an ultrasonic sensor (see, for example, JP 2015-078910 A).

An ultrasonic measuring device in JP 2015-078910 A includes: the ultrasonic sensor (an ultrasonic vibrator) fixed to a surface of a pipe; a temperature sensor (more specifically, a thermocouple) fixed to the surface of the pipe so as to be adjacent to the ultrasonic sensor; and a flaw detector body. The ultrasonic sensor includes: a piezoelectric element that transmits and receives ultrasonic waves; and the calibration plate fixed to a lower surface (that is, a surface on the pipe side) or a surface (that is, a surface opposite to the pipe side) of the piezoelectric element.

The flaw detector body calculates a wall thickness of the pipe based on a propagation time of a reflected wave reflected on a back surface of the pipe (that is, a surface opposite to the piezoelectric element side). Since the thickness and the material of the calibration plate are known, the flaw detector body calibrates a time axis or the like based on the propagation time of the reflected wave reflected on the back side of the calibration plate (that is, the surface opposite to the piezoelectric element side). Meanwhile, a sound velocity of the pipe or the calibration board varies depending not only on the material but also on temperature. Thus, the flaw detector body corrects the sound velocity in accordance with the temperature detected by a temperature sensor.

SUMMARY OF THE INVENTION

As described above, the inspection of a large number of pipes and containers is regulated in nuclear power plants and the like. In addition, an inspection method recommended by the Japan Society of Mechanical Engineers is defined as for an inspection of a wall thickness of a pipe, and it is required that a pitch of an inspection point of the pipe be 100 mm or less. Thus, it is necessary to attach a large number of sensors, and it is preferable that a configuration of the sensor be simple. In JP 2015-078910 A, however, the temperature sensor is required in addition to the ultrasonic sensor, which results in a complicated configuration. If the number of temperature sensors is reduced with respect to the number of ultrasonic sensors, it is necessary to perform evaluation by interpolating a temperature at the inspection point based on a temperature detected by the temperature sensor so that accuracy of sound velocity correction decreases.

The invention has been made in view of the above circumstances, and an object thereof is to provide an ultrasonic inspection system which does not require a temperature sensor and can enhance accuracy of sound velocity correction with a simple configuration.

In order to achieve the above object, the invention provides an ultrasonic inspection system including: an ultrasonic sensor having a piezoelectric element that transmits and receives an ultrasonic wave; and a control device that acquires a propagation time of a reflected wave reflected on a surface of a subject opposite to a side of the piezoelectric element, and calculates a thickness of the subject based on a propagation time of the reflected wave and sound velocity of the subject. The ultrasonic sensor includes first and second plate portions which are arranged so as to contact either a surface of the piezoelectric element on a side of the subject or a surface of the piezoelectric element opposite to the side of the subject and are different in at least one of a thickness and a sound velocity. The control device acquires a propagation time of a first reflected wave reflected on a surface of the first plate portion opposite to the side of the piezoelectric element and a propagation time of the second reflected wave reflected on a surface of the second plate portion opposite to the side of the piezoelectric element, calculates a sound velocity of the first plate portion using the propagation time of the first reflected wave and a thickness of the first plate portion, corrects the sound velocity of the subject and acquires a sound velocity of the second plate portion based on the calculated sound velocity of the first plate portion, and calibrates a time axis based on the propagation time of the second reflected wave, a thickness of the second plate portion, and the sound velocity of the second plate portion.

According to the invention, the temperature sensor is unnecessary, and the accuracy of the sound velocity correction can be improved with a simple configuration.

DESCRIPTION OF THE PREFERRED EMBODIMENTS

Hereinafter, a first embodiment of the invention will be described with reference to the drawings.

Figure 1:
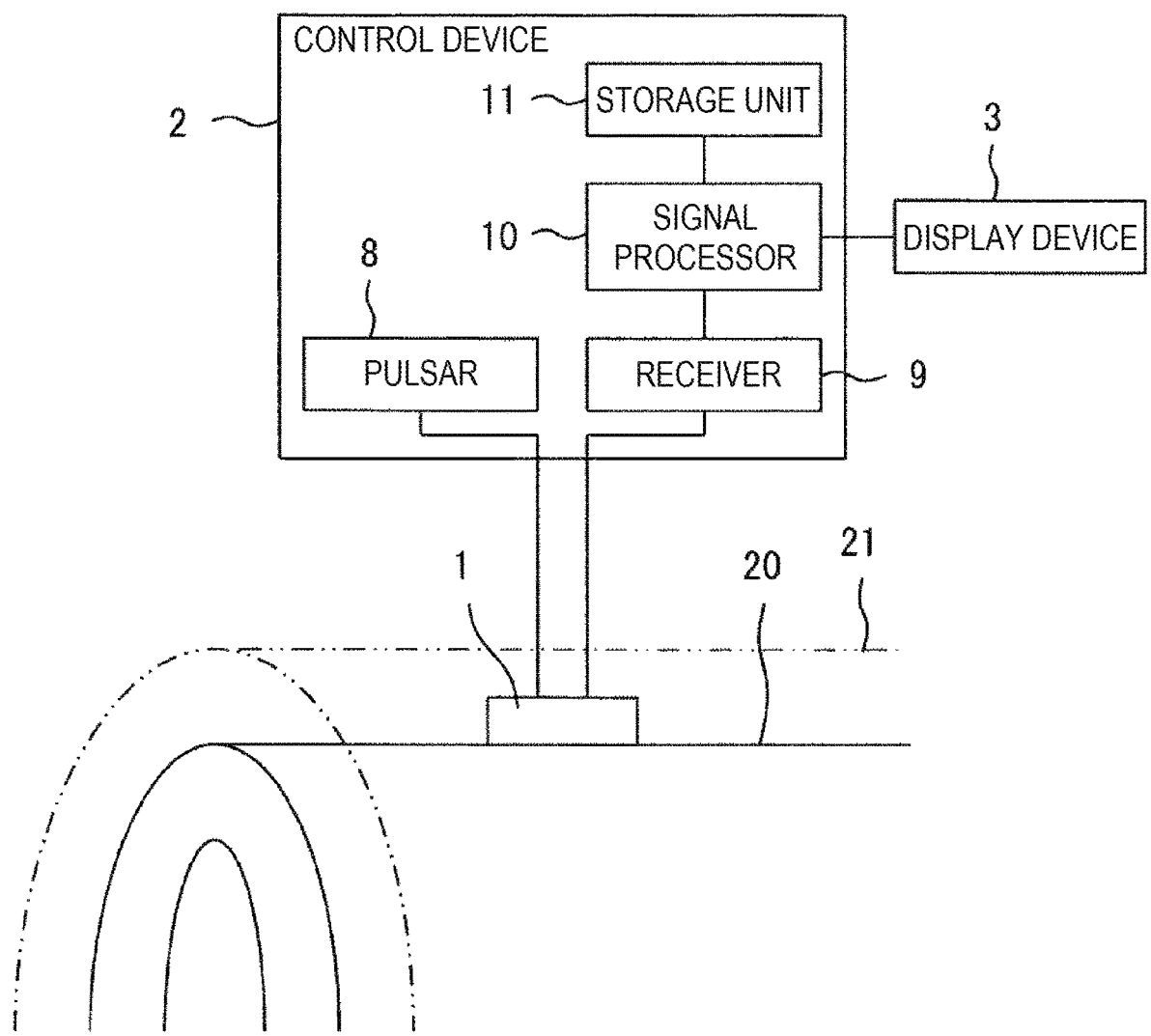
FIG. 1 is a schematic diagram illustrating a configuration of an ultrasonic inspection system according to a first embodiment of the invention together with a pipe as a subject.
Figure 2:
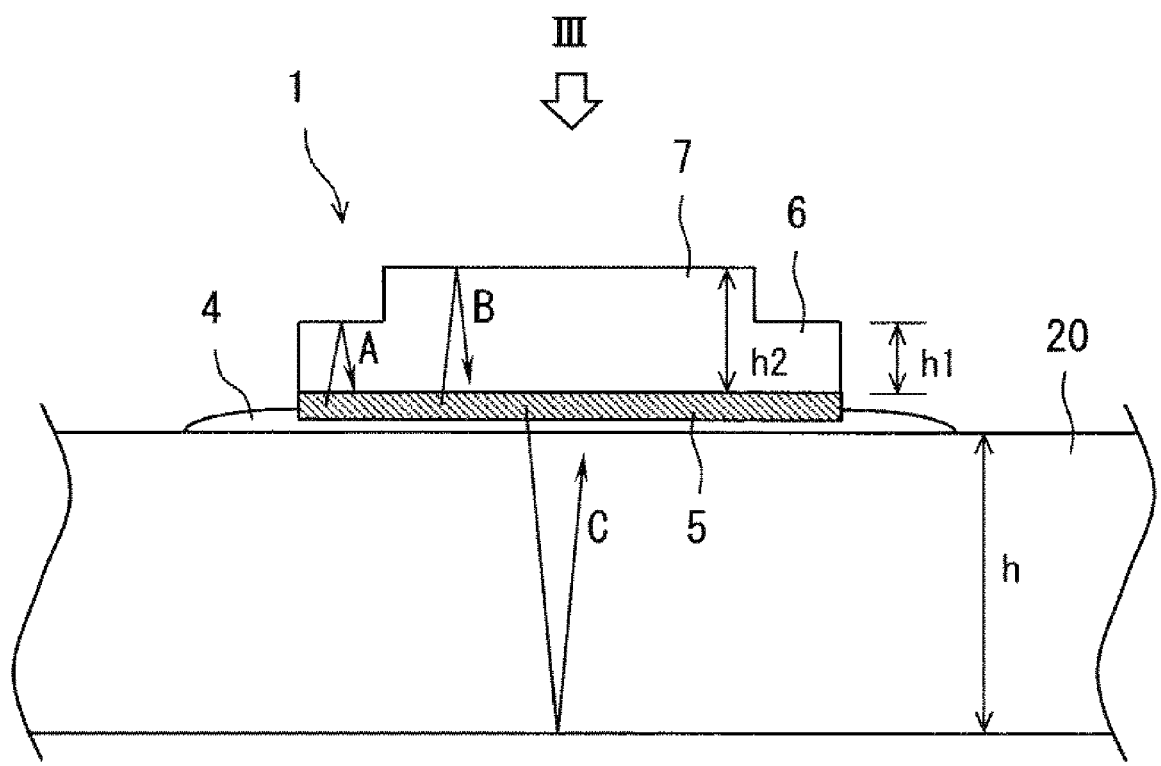
FIG. 2 is a cross-sectional view illustrating a structure of an ultrasonic sensor according to the first embodiment of the invention.
Figure 3:
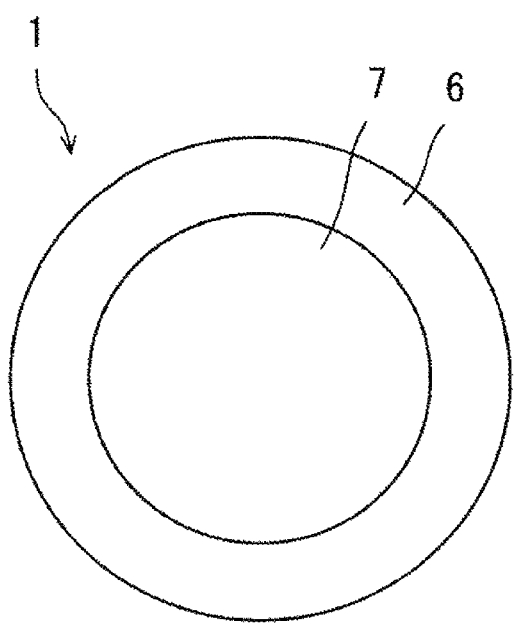
FIG. 3 is a view as seen from a direction of an arrow III in FIG. 2.

FIG. 1 is a schematic diagram illustrating a configuration of an ultrasonic inspection system according to an embodiment of the invention together with a pipe as a subject. FIG. 2 is a cross-sectional view illustrating a structure of an ultrasonic sensor according to the embodiment, and FIG. 3 is a view as seen from a direction of an arrow III in FIG. 2.

A pipe 20, which is a subject of the embodiment, is made of, for example, carbon steel or stainless steel, and a temperature thereof becomes high as a liquid or a gas flows therein during an operation of a plant. Thus, it is covered with a heat insulating material 21 made of, for example, calcium silicate, rock wool, glass wool, amorphous gel, or hard urethane foam.

The ultrasonic inspection system of the embodiment includes an ultrasonic sensor 1, a control device 2, and a display device 3 (display). The ultrasonic sensor 1 is fixed to a surface of the pipe 20 under the heat insulating material 21 via a heat-resistant adhesive 4 (a contact medium).

The ultrasonic sensor 1 of the embodiment includes a piezoelectric element 5 and plate portions 6 and 7 arranged so as to contact an upper surface of the piezoelectric element 5 (that is, a surface opposite to the subject side). The piezoelectric element 5 is made of, for example, piezoelectric ceramics such as lead zirconate titanate. Although the plate portions 6 and 7 are made of the same material and integrally molded, thicknesses thereof are different from each other. Although the material of the plate portions 6 and 7 is preferably the same as the material of the pipe 20 (carbon steel or stainless steel), it may be, for example, aluminum, lead, titanium, brass, and ceramics such as alumina. The plate portions 6 and 7 are fixed to the upper surface of the piezoelectric element 5 using a heat-resistant adhesive or the like.

The piezoelectric element 5 is formed in, for example, a discoid shape. The plate portion 7 is formed, for example, in a discoid shape, and the plate portion 6 is positioned on an outer peripheral side of the plate portion 7 and formed in an annular plate shape, for example. The plate portions 6 and 7 are arranged to be concentric with respect to the piezoelectric element 5. In addition, the plate portions 6 and 7 are configured such that the total area of lower surfaces thereof (that is, the total contact area with the piezoelectric element 5) is the same as the area of the upper surface of the piezoelectric element 5. A thickness h2 of the plate portion 7 is larger than a thickness h1 of the plate portion 6, and a difference (h2−h1) therebetween is larger than a wavelength (=sound velocity/frequency) of an ultrasonic wave. The thickness h1 of the plate portion 6 and the thickness h2 of the plate portion 7 are known and are stored in a storage unit 11 of the control device 2 to be described later.

The control device 2 includes a pulsar 8, a receiver 9, a signal processor 10, and the storage unit 11. The signal processor 10 is configured using a processor or the like that executes processing according to a program, and the storage unit 11 is configured using a hard disk, a memory, or the like.

The piezoelectric element 5 of the ultrasonic sensor 1 vibrates in a thickness direction by a drive signal (electric signal) from the pulsar 8 of the control device 2 and transmits ultrasonic waves to the plate portions 6 and 7 and the pipe 20. In addition, as illustrated in FIG. 2, the piezoelectric element 5 receives a reflected wave A reflected on an upper surface of the plate portion 6 (that is, a surface opposite to the piezoelectric element 5 side), a reflected wave B reflected on an upper surface of the plate portion 7 (that is, a surface opposite to the piezoelectric element 5 side), and a reflected wave C reflected on an inner surface of the pipe 20 (that is, a surface opposite to the piezoelectric element 5 side). Then, the reflected waves A, B, and C are converted into waveform signals (electric signals) and output to the receiver 9 of the control device 2.

Figure 4:
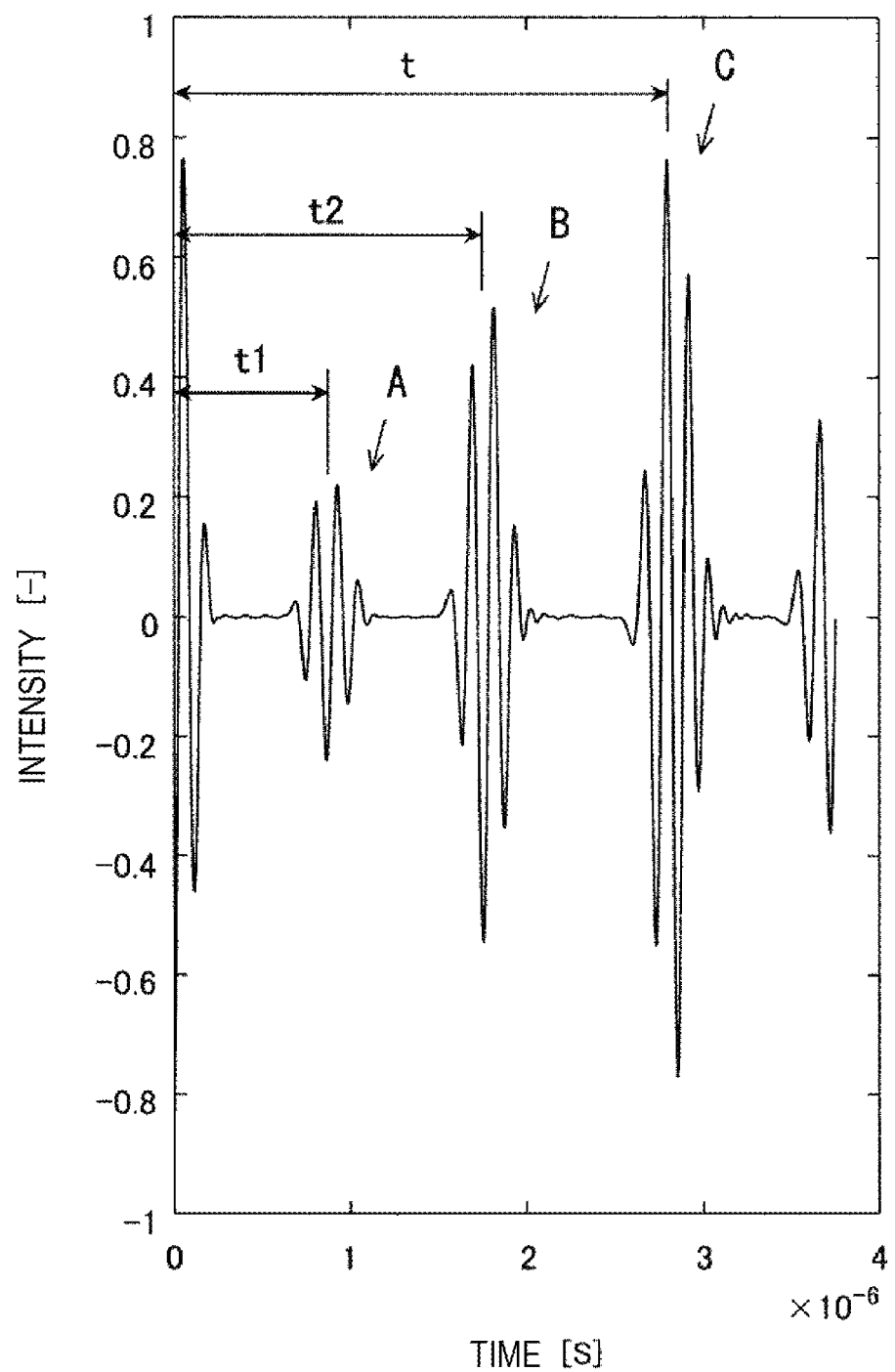
FIG. 4 is a graph illustrating a specific example of a reception waveform according to the first embodiment of the invention.

The signal processor 10 of the control device 2 executes predetermined processing (more specifically, conversion processing from an analog signal to a digital signal, or the like) on the waveform signals obtained via the receiver 9. As a result, waveform data of the reflected waves A, B, and C is acquired as illustrated in FIG. 4. Then, the waveform data is output to the storage unit 11 to be stored, and output to the display device 3 to be displayed. Incidentally, FIG. 4 illustrates a case in which the thickness h1 of the plate portion 6 is 2.5 mm, the thickness h2 of the plate portion 7 is 5 mm, a wall thickness h of the pipe 20 is 8 mm, the material of the plate portions 6 and 7 and the pipe 20 is carbon steel, and a center frequency of the ultrasonic wave is 8 MHz as an example.

Figure 5:
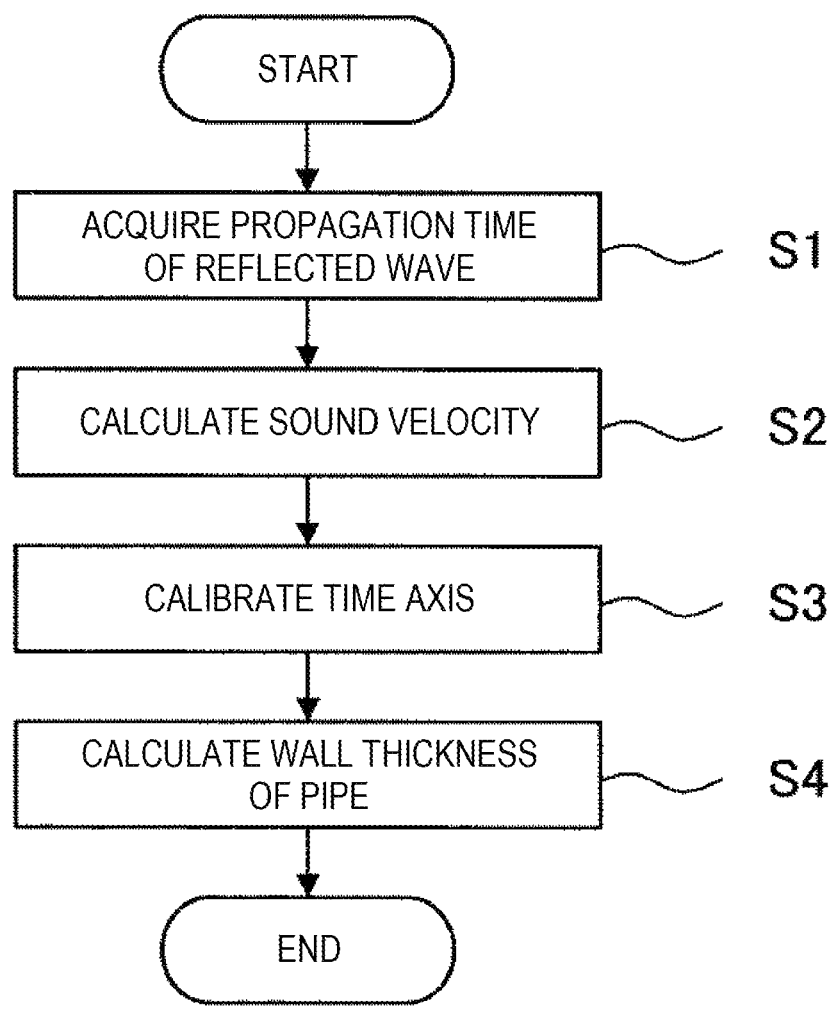
FIG. 5 is a flowchart illustrating a processing procedure of a control device according to the first embodiment of the invention.

Next, processing content of the control device 2 of the embodiment will be described. FIG. 5 is a flowchart illustrating a processing procedure of the control device 2 according to the embodiment.

In step S1, the pulsar 8 of the control device 2 outputs the drive signal to the piezoelectric element 5 of the ultrasonic sensor 1 to transmit ultrasonic waves from the piezoelectric element 5. Thereafter, the piezoelectric element 5 receives the above-described reflected waves A, B, and C, converts the waves into waveform signals, and outputs the signals to the receiver 9 of the control device 2. The signal processor 10 of the control device 2 executes the predetermined processing on the waveform signals obtained via the receiver 9 to acquire the waveform data of the reflected waves A, B, and C. Then, a propagation time t1 of the reflected wave A, a propagation time t2 of the reflected wave B, and a propagation time t of the reflected wave C are calculated and acquired, for example, with an output timing of the drive signal as a start point and a timing at which each amplitude (interpolated value) of each of the reflected waves become maximum as an end point.

Thereafter, the processing proceeds to step S2, and the signal processor 10 calculates a sound velocity v1 of the plate portion 6 using the propagation time t1 of the reflected wave A and the thickness h1 of the plate portion 6 (see the following Formula (1)). In the embodiment, the material of the plate portion 6 is the same as the material of the plate portion 7 so that a temperature of the plate portion 6 and a temperature of the plate portion 7 can be considered to be the same. Thus, the sound velocity v1 of the plate portion 6 and the sound velocity v2 of the plate portion 7 are the same.

$$v1 = 2 \times h1/t1 \qquad (1)$$

When the material of the plate portion 6 and the material of the pipe 20 are the same, the temperature of the plate portion 6 and a temperature of the pipe 20 can be considered to be the same, and thus, the sound velocity v1 of the plate portion 6 and the sound velocity v of the pipe 20 are the same. On the other hand, when the material of the plate portion 6 is different from the material of the pipe 20, the temperature of the plate portion 6 is calculated from the sound velocity v1 of the plate portion 6 by using a relational expression between the sound velocity v1 of the plate portion 6 and the temperature of the plate portion 6 prepared in advance, and the temperature of the plate portion 6 and the temperature of the pipe 20 are considered to be the same. Then, the sound velocity v of the pipe 20 is calculated from the temperature of the pipe 20 by using a relational expression between the temperature of the pipe 20 and the sound velocity v of the pipe 20 prepared in advance. As a result, the sound velocity of the pipe 20 can be corrected in accordance with the temperature of the pipe 20.

Thereafter, the processing proceeds to step S3, and the signal processor 10 calibrates a time axis (more specifically, the start point of the propagation time) based on the propagation time t2 of the reflected wave B, the sound velocity v2 of the plate portion 7, and the thickness h2 of the plate portion 7. More particularly, for example, a thickness h2' of the plate portion 7 is calculated using the propagation time t2 of the reflected wave B and the sound velocity v2 of the plate portion 7 (see the following Formula (2)). Then, it is determined whether a difference between the actually measured value h2 of the thickness of the plate portion 7 and the calculated value h2' falls within an allowable range. When the difference does not fall within the allowable range, the time axis is calibrated such that the difference becomes small. That is, the propagation time t of the reflected wave C acquired in step S1 is corrected.

$$h2' = 0.5 \times t2 \times v2 \qquad (2)$$

Thereafter, the processing proceeds to step S4, and the signal processor 10 calculates the wall thickness h of the pipe 20 using the propagation time t of the reflected wave C and the sound velocity v of the pipe 20 obtained as described above (see the following Formula (3)). The signal processor 10 outputs the calculated thickness h of the pipe 20 to the storage unit 11 to be stored and outputs the thickness h to the display device 3 to be displayed.

$$h = 0.5 \times t \times v \qquad (3)$$

In the embodiment configured as described above, the ultrasonic sensor 1 includes not only the plate portion 7 for calibration of the time axis but also the plate portion 6 for correction of the sound velocity, which enables the temperature sensor not to be used. Therefore, it is possible to enhance accuracy of sound velocity correction with a simple configuration.

A second embodiment of the invention will be described with reference to FIGS. 6 to 8. In the embodiment, parts equivalent to those in the above-described embodiment will be denoted by the same reference signs, and the description thereof will be omitted as appropriate.

Figure 6:
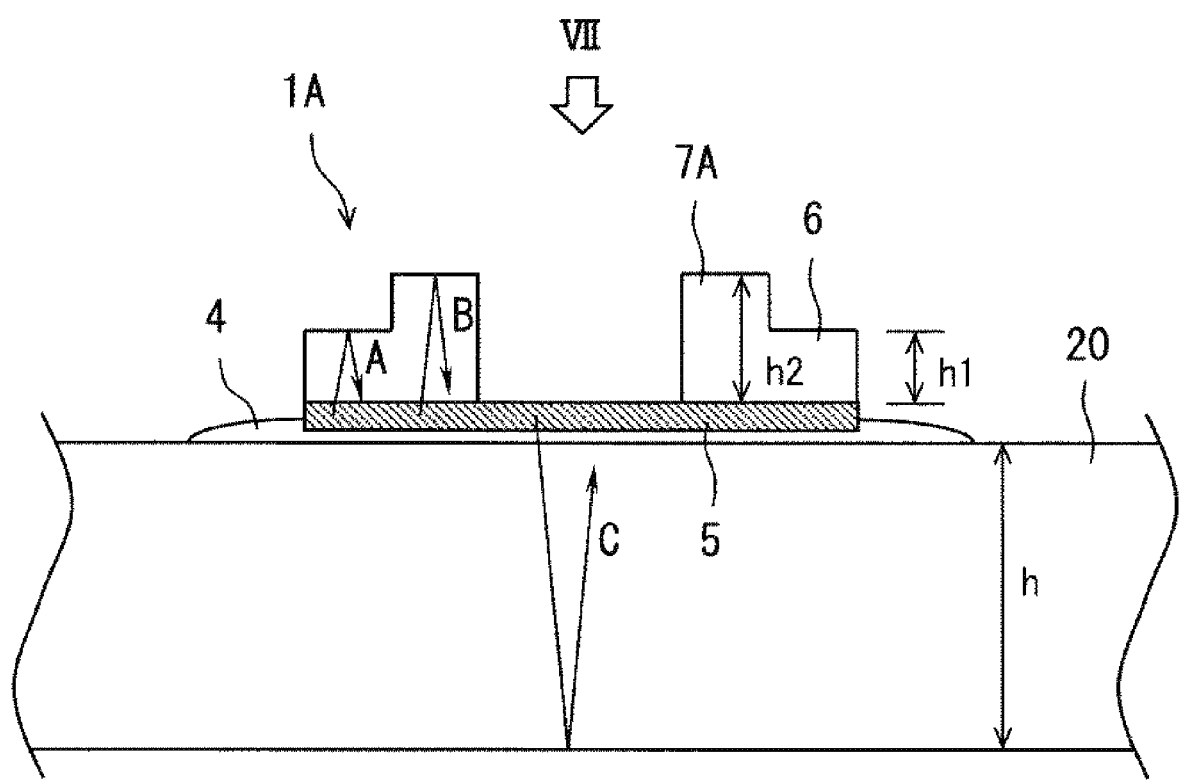
FIG. 6 is a cross-sectional view illustrating a structure of an ultrasonic sensor according to a second embodiment of the invention.
Figure 7:
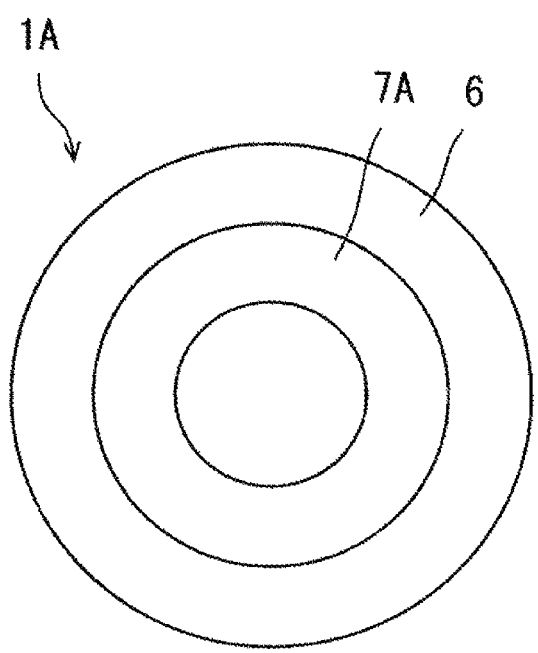
FIG. 7 is a view as seen from a direction of an arrow VII in FIG. 6.

FIG. 6 is a cross-sectional view illustrating a structure of an ultrasonic sensor according to the embodiment, and FIG. 7 is a view as seen from a direction of an arrow VII in FIG. 6.

An ultrasonic sensor 1A of the embodiment includes the piezoelectric element 5 and plate portions 6 and 7A arranged so as to contact the upper surface of the piezoelectric element 5. Although the plate portions 6 and 7A are made of the same material and integrally molded, thicknesses thereof are different from each other.

The piezoelectric element 5 is formed in, for example, a discoid shape. The plate portion 7A is formed, for example, in an annular plate shape, and the plate portion 6 is positioned on an outer peripheral side of the plate portion 7A and formed in an annular plate shape, for example. The plate portions 6 and 7A are arranged to be concentric with respect to the piezoelectric element 5. In addition, the plate portions 6 and 7A are configured such that the total area of lower surfaces thereof (that is, the total contact area with the piezoelectric element 5) is smaller than the area of the upper surface of the piezoelectric element 5 (more specifically, to be ¼ of the area of the upper surface of the piezoelectric element 5, for example).

The piezoelectric element 5 vibrates in the thickness direction by a drive signal from the pulsar 8 of the control device 2 and transmits ultrasonic waves to the pipe 20 and the plate portions 6 and 7A. As illustrated in FIG. 6, the piezoelectric element 5 receives the reflected wave A reflected on the upper surface of the plate portion 6, a reflected wave B reflected on an upper surface of the plate portion 7A, and the reflected wave C reflected from the inner surface of the pipe 20. Then, the reflected waves A, B, and C are converted into waveform signals and output to the receiver 9 of the control device 2.

The signal processor 10 of the control device 2 executes predetermined processing on the waveform signals obtained via the receiver 9. As a result, waveform data of the reflected waves A, B, and C is acquired as illustrated in FIG. 8. The subsequent processing content is the same as that of the first embodiment.

Even in the embodiment configured as described above, the ultrasonic sensor 1A includes not only the plate portion 7A for calibration of the time axis but also the plate portion 6 for correction of the sound velocity, which enables the temperature sensor not to be used, which is similar to the above-described embodiment. Therefore, it is possible to enhance accuracy of sound velocity correction with a simple configuration.

Figure 8:
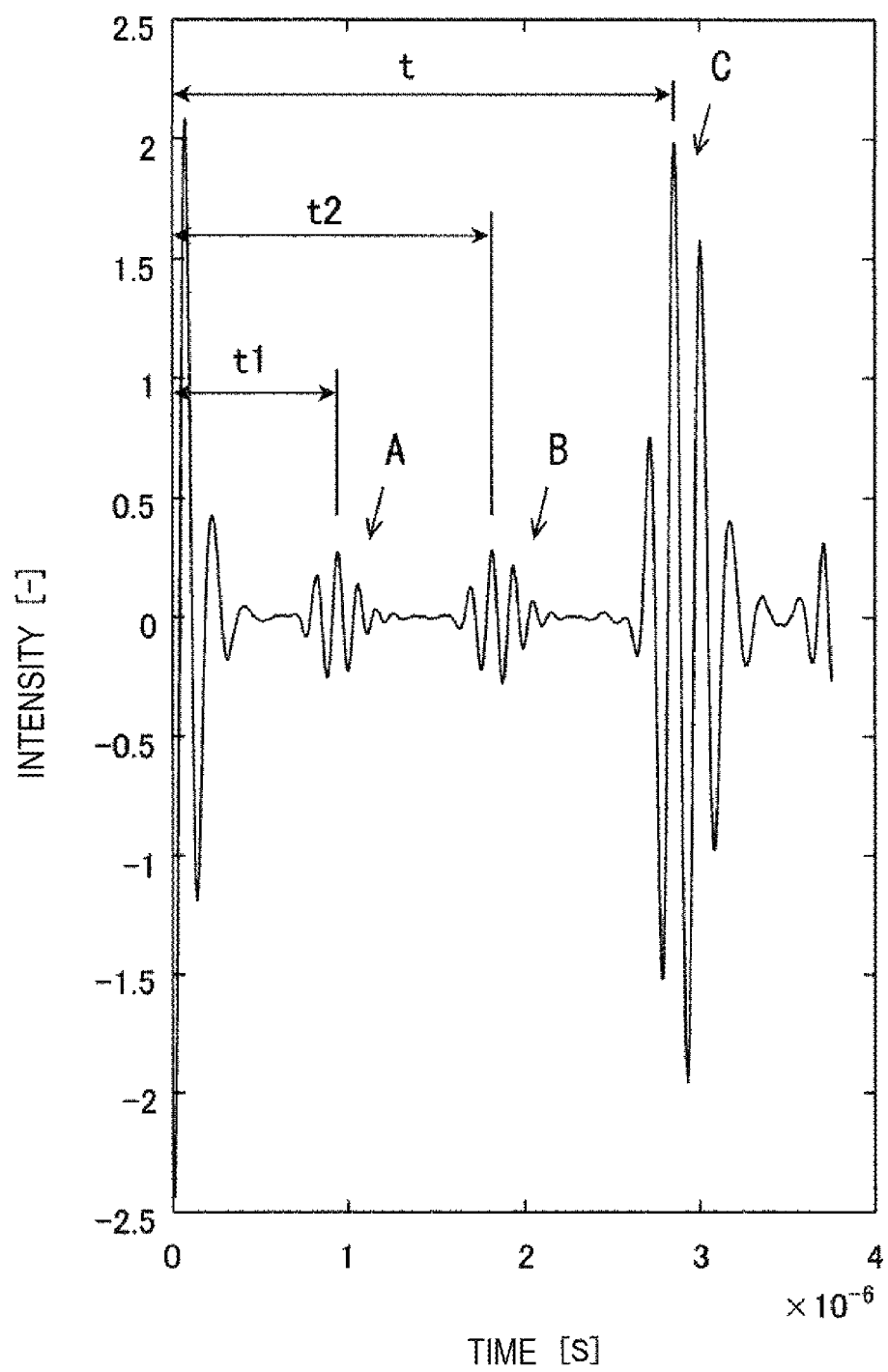
FIG. 8 is a view illustrating a specific example of a reception waveform according to the second embodiment of the invention.

In addition, the contact area between the plate portion 7A and the piezoelectric element 5 in the embodiment is smaller than the contact area between the plate portion 7 and the piezoelectric element 5 in the first embodiment, and thus, it is possible to decrease an amplitude of the reflected wave B (see FIG. 8). In addition, the total contact area between the plate portions 6 and 7A and the piezoelectric element 5 is smaller than the total contact area between the plate portions 6 and 7 and the piezoelectric element 5 in the first embodiment, and thus, it is possible to increase an amplitude of the reflected wave C (see FIG. 8). This is because a part that does not contact the plate portions 6 and 7A is present on the upper surface side of the piezoelectric element 5, and accordingly, the intensity of the ultrasonic wave transmitted from the lower surface side of the piezoelectric element 5 increases. Therefore, in the embodiment, it is possible to suppress influence of the reflected wave B or the reflected wave A on the reflected wave C even when the thickness h of the pipe 20 is thin and is close to the thickness h2 of the plate portion 7A or the thickness h1 of the plate portion 6 (that is, even when a reception timing of the reflected wave C is close to a reception timing of the reflected wave B or a reception timing of the reflected wave C).

Although the description has been given in the first and second embodiments by exemplifying the case where the sound velocity v1 of the plate portion 6 is calculated using the propagation time t1 of the reflected wave A and the thickness h1 of the plate portion 6, the sound velocity of the pipe 20 is corrected and the sound velocity v2 of the plate portion 7 is acquired based on the calculated sound velocity v1, and the time axis is calibrated based on the propagation time t2 of the reflected wave B, the thickness h2 of the plate portion 7 or 7A, and the sound velocity v2 of the plate portion 7 or 7A, the invention is not limited thereto, and modifications can be made within a range not departing from a gist and a technical idea of the invention. That is, the sound velocity v2 of the plate portion 7 may be calculated using the propagation time t2 of the reflected wave B and the thickness h2 of the plate portion 7, the sound velocity of the pipe 20 may be corrected and the sound velocity v1 of the plate portion 6 may be acquired based on the calculated sound velocity v2, and the time axis may be calibrated based on the propagation time t1 of the reflected wave A, the thickness h1 of the plate portion 6, and the sound velocity v1 of the plate portion 6.

In addition, the description has been given in the first and second embodiments by exemplifying the case where the thickness of the plate portion 7 or 7A on the radially inner side is larger than the thickness of the plate portion 6 on the radially outer side, but the invention is not limited thereto, and modifications can be made within the range not departing from the gist and the technical idea of the invention. That is, the thickness of the plate portion on the radially outer side may be larger than the thickness of the plate portion on the radially inner side.

A third embodiment of the invention will be described with reference to FIGS. 9 and 10. In the embodiment, parts equivalent to those in the above-described embodiment will be denoted by the same reference signs, and the description thereof will be omitted as appropriate.

Figure 9:
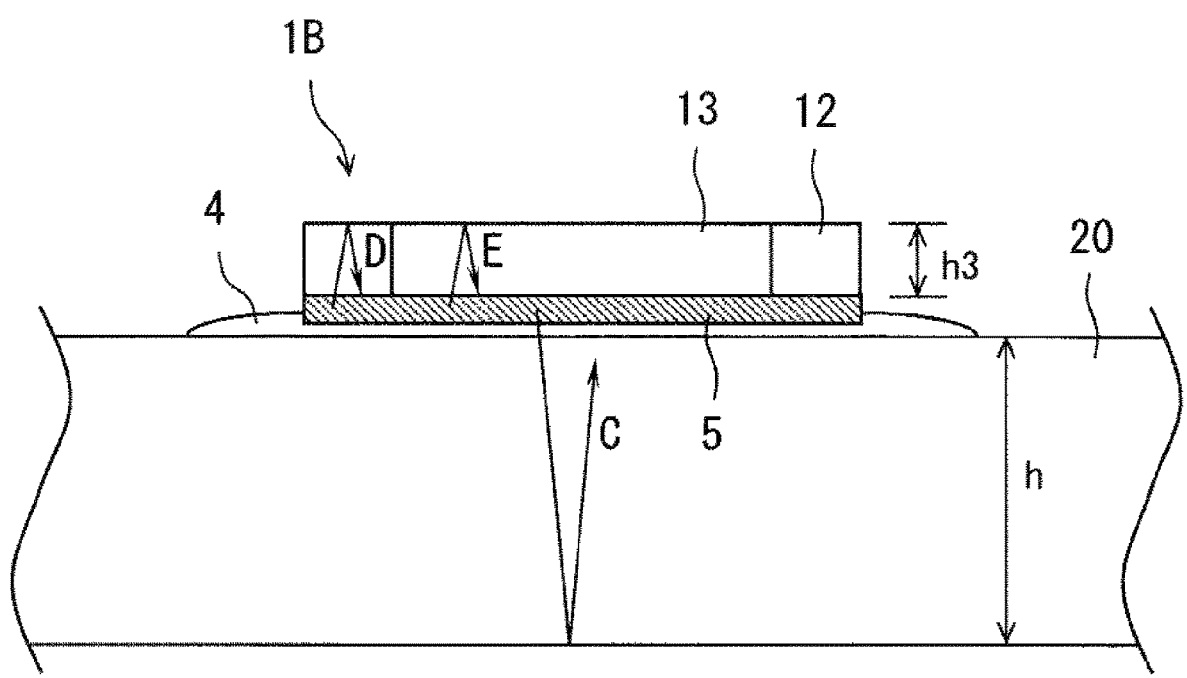
FIG. 9 is a cross-sectional view illustrating a structure of an ultrasonic sensor according to a third embodiment of the invention.
Figure 10:
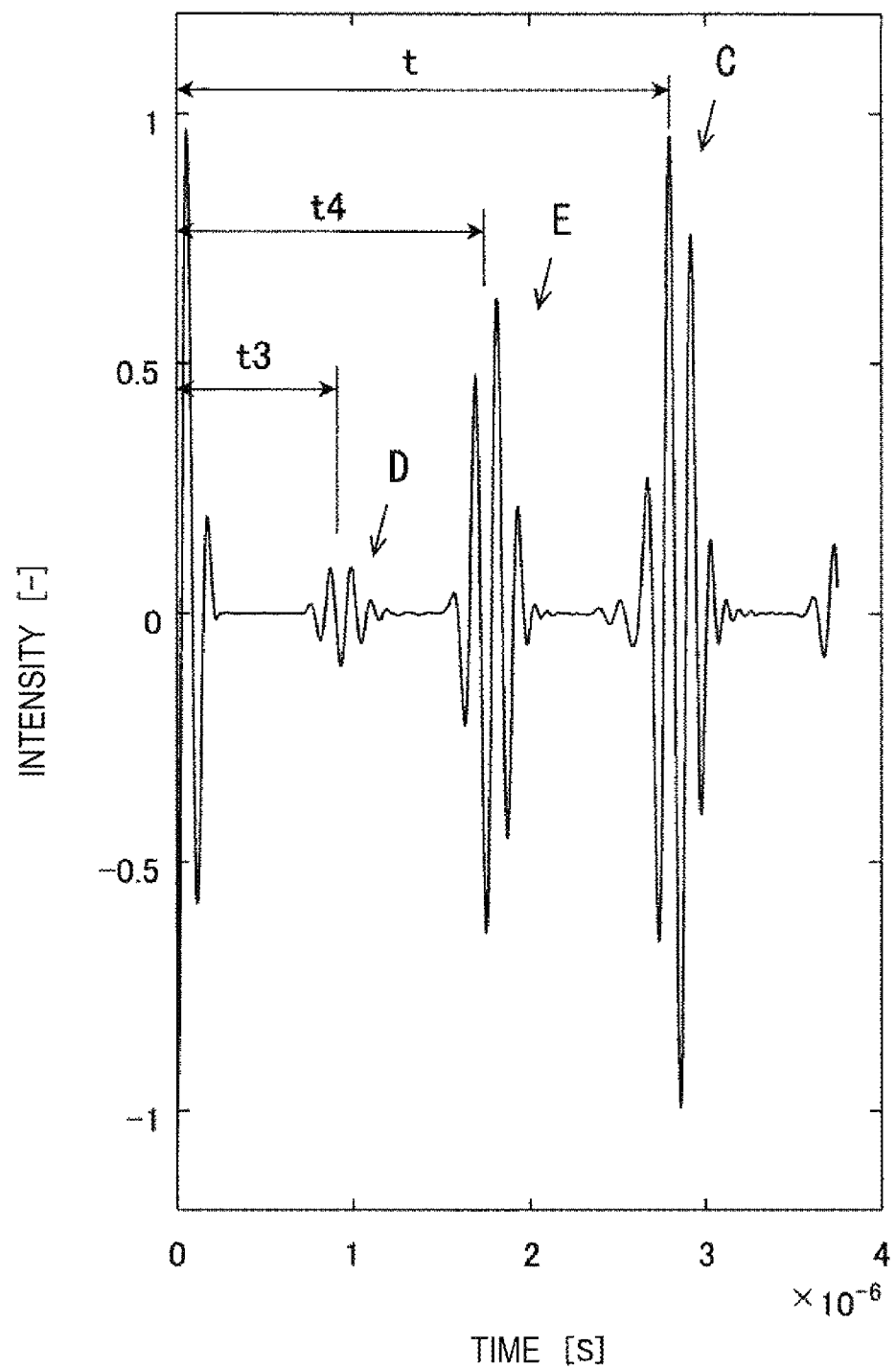
FIG. 10 is a view illustrating a specific example of a reception waveform according to the third embodiment of the invention.

FIG. 9 is a cross-sectional view illustrating a structure of an ultrasonic sensor according to the embodiment.

An ultrasonic sensor 1B of the embodiment includes the piezoelectric element 5 and plate portions 12 and 13 arranged so as to contact the upper surface of the piezoelectric element 5.

The plate portions 12 and 13 are made of different materials (that is, have sound velocities different from each other), but have the same thickness. A material of one plate portion (the plate portion 12 in the embodiment) of the plate portions 12 and 13 is preferably made the same as a material of the pipe 20 (carbon steel or stainless steel), but may be, for example, aluminum, lead, titanium, brass, ceramics such as alumina. A material of the other plate portion (the plate portion 13 in the embodiment) of the plate portions 12 and 13 may be any material, different from the material of the one plate portion, among, for example, carbon steel, stainless steel, aluminum, lead, titanium, brass, and ceramics such as alumina.

The piezoelectric element 5 is formed in, for example, a discoid shape. The plate portion 13 is formed, for example, in a discoid shape, and the plate portion 12 is positioned on an outer peripheral side of the plate portion 13 and formed in an annular plate shape, for example. The plate portions 12 and 13 are arranged to be concentric with respect to the piezoelectric element 5. In addition, the plate portions 12 and 13 are configured such that the total area of lower surfaces thereof (that is, the total contact area with the piezoelectric element 5) is the same as the area of the upper surface of the piezoelectric element 5. The plate portions 12 and 13 are fixed to the upper surface of the piezoelectric element 5 using a high-temperature adhesive or the like.

The piezoelectric element 5 vibrates in the thickness direction by a drive signal from the pulsar 8 of the control device 2 and transmits ultrasonic waves to the plate portions 12 and 13 and the pipe 20. As illustrated in FIG. 9, the piezoelectric element 5 receives a reflected wave D reflected on an upper surface of the plate portion 12 (that is, a surface opposite to the piezoelectric element 5 side), a reflected wave E reflected on an upper surface of the plate portion 13 (that is, a surface opposite to the piezoelectric element 5 side), and the reflected wave C reflected on the inner surface of the pipe 20. Then, the reflected waves D, E, and C are converted into waveform signals and output to the receiver 9 of the control device 2.

Figure 11:
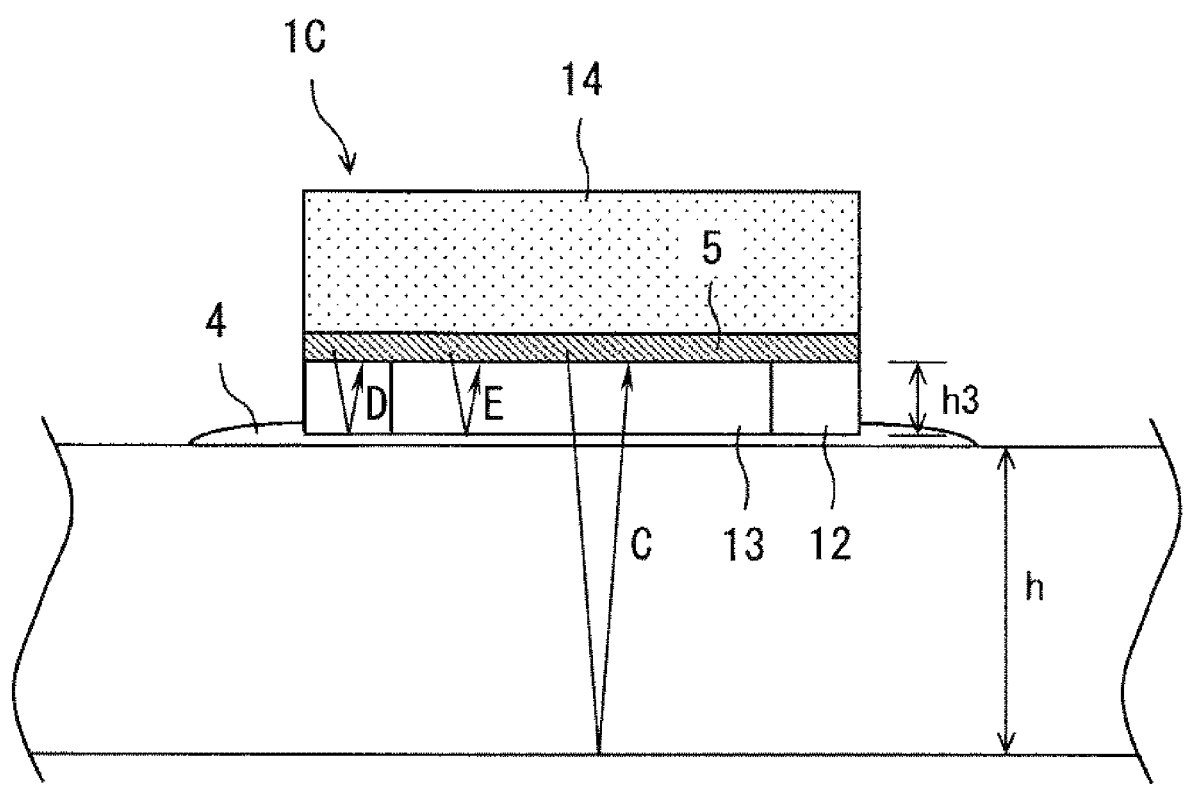
FIG. 11 is a cross-sectional view illustrating a structure of an ultrasonic sensor according to a fourth embodiment of the invention.

The signal processor 10 of the control device 2 executes predetermined processing on the waveform signals obtained via the receiver 9. As a result, waveform data of the reflected waves D, E, and C is acquired as illustrated in FIG. 11. Then, a propagation time t3 of the reflected wave D, a propagation time t4 of the reflected wave E, and the propagation time t of the reflected wave C are acquired.

Thereafter, the signal processor 10 calculates a sound velocity v3 of the plate portion 12 using the propagation time t3 of the reflected wave D and a thickness h3 of the plate portion 12 (see the following Formula (4)). A temperature of the plate portion 12 is calculated from the sound velocity v3 of the plate portion 12 by using a relational expression between the sound velocity v3 of the plate portion 12 and a temperature of the plate portion 12 prepared in advance, and the temperature of the plate portion 12 and a temperature of the plate portion 13 are considered to be the same. Then, a sound velocity v4 of the plate portion 13 is calculated from the temperature of the plate portion 13 by using a relational expression between the temperature of the plate portion 13 and the sound velocity v4 of the plate portion 13 prepared in advance.

$$v3 = 2 \times h3/t3 \quad (4)$$

When the material of the plate portion 12 and the material of the pipe 20 are the same, the temperature of the plate portion 12 and a temperature of the pipe 20 can be considered to be the same, and thus, the sound velocity v3 of the plate portion 12 and the sound velocity v of the pipe 20 are the same. On the other hand, when the material of the plate portion 12 is different from the material of the pipe 20, the temperature of the plate portion 12 obtained as described above and the temperature of the pipe 20 are considered to be the same. Then, the sound velocity v of the pipe 20 is calculated from the temperature of the pipe 20 by using a relational expression between the temperature of the pipe 20 and the sound velocity v of the pipe 20 prepared in advance.

As a result, the sound velocity of the pipe 20 can be corrected in accordance with the temperature of the pipe 20.

Thereafter, the signal processor 10 calibrates a time axis (in detail, a start point of a propagation time) based on the propagation time t4 of the reflected wave E, the sound velocity v4 of the plate portion 13, and the thickness h3 of the plate portion 13. More particularly, for example, a thickness h3' of the plate portion 13 is calculated using the propagation time t4 of the reflected wave E and the sound velocity v4 of the plate portion 13 (see the following Formula (5)). Then, it is determined whether a difference between the actually measured value h3 of the thickness of the plate portion 13 and the calculated value h3' falls within an allowable range. When the difference does not fall within the allowable range, the time axis is calibrated such that the difference becomes small. That is, the propagation time t of the reflected wave C acquired in step S1 is corrected.

$$h3'=0.5 \times t3 \times v3 \quad (5)$$

Thereafter, the signal processor 10 calculates the wall thickness h of the pipe 20 using the propagation time t of the reflected wave C and the sound velocity v of the pipe 20 obtained as described above (see the above-described Formula (3)). The signal processor 10 outputs the calculated thickness h of the pipe 20 to the storage unit 11 to be stored and outputs the thickness h to the display device 3 to be displayed.

Even in the embodiment configured as described above, the ultrasonic sensor 1B includes not only the plate portion 13 for calibration of the time axis but also the plate portion 12 for correction of the sound velocity, which enables the temperature sensor not to be used, which is similar to the above-described embodiment. Therefore, it is possible to enhance accuracy of sound velocity correction with a simple configuration.

Although the description has been given in the third embodiment by exemplifying the case where the plate portions 12 and 13 are configured such that the total contact area with the piezoelectric element 5 is the same as the area of the upper surface of the piezoelectric element 5, the invention is not limited thereto, and modifications can be made within the range not departing from the gist and the technical idea of the invention. That is, the plate portions 12 and 13 may be configured such that the total contact area with the piezoelectric element 5 is smaller than the area of the upper surface of the piezoelectric element 5, which is similar to the second embodiment. More particularly, the plate portion 13 may be formed, for example, in a discoid shape, and the plate portion 12 may be positioned on an outer peripheral side of the plate portion 13 and formed in an annular plate shape, for example. In this case, it is possible to obtain the same effects as those of the second embodiment.

In addition, the description has been given by exemplifying the case where the thicknesses of the two plate portions are different in the first and second embodiments, and the case where the materials are different such that the sound velocities of the two plate portions are different in the third embodiment, but these configurations may be combined. That is, the two plate portions may be made of different materials so as to have different thicknesses and different sound velocities. Even in this case, the same effects as described above can be obtained.

A fourth embodiment of the invention will be described with reference to FIG. 11. In the embodiment, parts equivalent to those in the above-described embodiment will be denoted by the same reference signs, and the description thereof will be omitted as appropriate.

FIG. 11 is a cross-sectional view illustrating a structure of an ultrasonic sensor according to the embodiment.

An ultrasonic sensor 1C according to the embodiment includes the piezoelectric element 5, a backing material 14 arranged so as to contact the upper surface of the piezoelectric element 5 (that is, a surface opposite to the subject side), and the plate portions 12 and 13 arranged so as to contact a lower surface of the piezoelectric element 5 (that is, a surface on the subject side).

The piezoelectric element 5 vibrates in the thickness direction by a drive signal from the pulsar 8 of the control device 2 and transmits ultrasonic waves to the plate portions 12 and 13 and the pipe 20. As illustrated in FIG. 11, the piezoelectric element 5 receives a reflected wave D reflected on a lower surface of the plate portion 12 (that is, a surface opposite to the piezoelectric element 5 side), a reflected wave E reflected on a lower surface of the plate portion 13 (that is, a surface opposite to the piezoelectric element 5 side), and the reflected wave C reflected on the inner surface of the pipe 20. Then, the reflected waves D, E, and C are converted into waveform signals and output to the receiver 9 of the control device 2. The subsequent processing content is the same as that of the third embodiment.

Even in the embodiment configured as described above, the ultrasonic sensor 1C includes not only the plate portion 13 for calibration of the time axis but also the plate portion 12 for correction of the sound velocity, which enables the temperature sensor not to be used, which is similar to the above-described embodiment. Therefore, it is possible to enhance accuracy of sound velocity correction with a simple configuration. In addition, noise can be reduced by the backing material 14 in the embodiment.

Although the description has been given in the third and fourth embodiments by exemplifying the case where the sound velocity v3 of the plate portion 12 is calculated using the propagation time t3 of the reflected wave D and the thickness h3 of the plate portion 12, the sound velocity of the pipe 20 is corrected and the sound velocity v4 of the plate portion 13 is acquired based on the calculated sound velocity v3, and the time axis is calibrated based on the propagation time t4 of the reflected wave E, the thickness h3 of the plate portion 13, and the sound velocity v4 of the plate portion 13, the invention is not limited thereto, and modifications can be made within a range not departing from a gist and a technical idea of the invention. That is, the sound velocity v4 of the plate portion 13 may be calculated using the propagation time t4 of the reflected wave E and the thickness h3 of the plate portion 13, the sound velocity of the pipe 20 may be corrected and the sound velocity v3 of the plate portion 12 may be acquired based on the calculated sound velocity v4, and the time axis may be calibrated based on the propagation time t3 of the reflected wave D, the thickness h3 of the plate portion 12, and the sound velocity v3 of the plate portion 12.

In addition, the control device 2 may have a function of monitoring an adhesion state of the plate portion 6 or 12 with respect to the piezoelectric element 5 although not particularly described in the first to fourth embodiments. More specifically, the plate portion 6 or 12 on the radially outer side is highly likely to be detached before the plate portion on the radially inner side. Thus, the control device 2 may determine whether a difference between a current value and a past value is larger than a predetermined threshold regarding the propagation time of the reflected wave A or D to detect an indication of detachment of the plate portion 6 or 12 and display a result of the detection on the display device 3.

In addition, the description has been given in the above-described embodiments by exemplifying the pipe 20 in which a liquid or a gas flows as the subject, but the invention is not limited thereto. For example, a container in which a liquid or a gas flows may be used as the subject.

What is claimed is:

1. An ultrasonic inspection system comprising:
   an ultrasonic sensor having a piezoelectric element that transmits and receives an ultrasonic wave; and
   a control device that acquires a propagation time of a subject reflected wave reflected on a surface of a subject opposite to a side of the piezoelectric element,
   wherein the ultrasonic sensor includes first and second plate portions which are arranged so as to contact either a surface of the piezoelectric element on a side of the subject or a surface of the piezoelectric element opposite to the side of the subject and are different in a thickness and/or a sound velocity, and
   the control device acquires a propagation time of a first reflected wave reflected on a surface of the first plate portion opposite to the side of the piezoelectric element and a propagation time of a second reflected wave reflected on a surface of the second plate portion opposite to the side of the piezoelectric element, calculates a sound velocity of the first plate portion using the propagation time of the first reflected wave and a thickness of the first plate portion, corrects the sound velocity of the subject and acquires a sound velocity of the second plate portion based on the calculated sound velocity of the first plate portion, and calibrates a start point of the propagation time of the subject reflected wave based on the propagation time of the second reflected wave, a thickness of the second plate portion, and the sound velocity of the second plate portion; and
   calculates a thickness of the subject based on the propagation time of the subject reflected wave and the corrected sound velocity of the subject.

2. The ultrasonic inspection system according to claim 1, wherein
   the first and second front plate portions are arranged so as to contact the surface of the piezoelectric element opposite to the side of the subject, and are made of an identical material to have different thicknesses and an identical sound velocity.

3. The ultrasonic inspection system according to claim 1, wherein
   the first and second front plate portions are arranged so as to contact the surface of the piezoelectric element opposite to the side of the subject, and are configured such that a total contact area with the piezoelectric element is smaller than an area of the surface of the piezoelectric element opposite to the side of the subject.

4. The ultrasonic inspection system according to claim 3, wherein
   the piezoelectric element is formed in a discoid shape,
   one plate portion of the first and second plate portions is formed in an annular plate shape, and
   the other plate portion of the first and second plate portions is positioned on an outer peripheral side of the one plate portion and is formed in an annular plate shape.

5. The ultrasonic inspection system according to claim 1, wherein
   the first and second plate portions are made of different materials so as to have different sound velocities and an identical thickness.

6. The ultrasonic inspection system according to claim 5, wherein
   the ultrasonic sensor further includes a backing material arranged so as to contact the surface of the piezoelectric element opposite to the side of the subject, and
   the first and second plate portions are arranged so as to contact the surface of the piezoelectric element on the side of the subject.

* * * * *